United States Patent [19]

Narita et al.

[11] 3,974,126

[45] Aug. 10, 1976

[54] PROCESS AND APPARATUS FOR CONTINUOUS PRODUCTION OF POLYCARBONATES

[75] Inventors: Yoshihiro Narita; Hideo Konuma; Hiroshi Nishitani; Norio Komori; Katsuharu Ogishima, all of Tokuyama, Japan

[73] Assignee: Idemitsu, Kosan Kabushiki-Kaisha, Tokyo, Japan

[22] Filed: June 25, 1974

[21] Appl. No.: 482,837

[30] Foreign Application Priority Data

June 27, 1973   Japan.............................. 48-72618

[52] U.S. Cl. ............................ 260/47 XA; 260/49; 260/77.5 D; 260/463; 23/285
[51] Int. Cl.² ......................................... C08G 63/62
[58] Field of Search ................. 260/47 XA, 463, 49

[56] References Cited

UNITED STATES PATENTS

| | | | |
|---|---|---|---|
| 3,674,740 | 7/1972 | Vernaleken et al. | 260/47 XA |
| 3,888,826 | 6/1975 | Yamana et al. | 260/47 XA |

*Primary Examiner*—Wilbert J. Briggs, Sr.
*Attorney, Agent, or Firm*—Spensley, Horn & Lubitz

[57] ABSTRACT

A heat resistant and impact resistant polycarbonate having a narrow distribution of molecular weight is continuously produced by reacting chloroformate ester, prepared in advance by reacting alkaline solution of dioxy compound in a turbulent flow of the two solutions while cooling and subsequently reacting the mixture concurrently in a laminar flow after the viscosity of the mixture has become significant.

13 Claims, 6 Drawing Figures

PROCESS AND APPARATUS FOR CONTINUOUS PRODUCTION OF POLYCARBONATES

BACKGROUND OF THE INVENTION

1. Field of the Invention

The present invention relates to a process and an apparatus for continuous production of polycarbonates, and more particularly to a process and an apparatus to produce polycarbonates having a narrow distribution of molecular weight thereof.

2. Prior Art

Heretofore, it has been known that polycarbonates from polycarbonate oligomer can be produced in stirring tanks connected in series in batch operation. According to a most commonly used process and apparatus, tanks with a stirring device, a cooling jacket and a baffle plate are connected in series by means of a pump. After feeding a reaction mixture consisting of polycarbonate oligomer, alkaline solution of dioxy compound, catalyst, molecular weight modifier and so on through an inlet, the condensation reaction proceeds in each tank by mixing reaction mixture with blades of the stirring device. However, the prior art method mentioned above has various drawbacks. The primary shortcomings of the method are: (a) each reaction tank must be stirred continuously in order to promote reaction and to maintain a suitable temperature; (b) undesirable mechanical trouble may often occur because of the complexity of the system; (c) viscosity of the reaction mixture may become as high as 2000-4000 cp during condensation, which makes it difficult to stir the mixture in terms of the undesirable agitating heat that requires heavy coolant circulated in the jacket to relieve the heat, since it has insufficient area for heat exchanging; (d) it requires a long time to change reaction conditions to manufacture different grades of products, which results in a greater amount of off-grade products, (e) increased production is difficult; and (f) the products are such that the molecular weight distribution is not well focused and the heat-resistance and impact-resistance are not qualified enough.

This invention solves those problems which the process and apparatus disclosed by the prior art have failed to resolve.

SUMMARY OF THE INVENTION

It is an object of this invention to provide a process for producing polycarbonates from polycarbonate oligomer in a continuous manner.

It is another object of this invention to provide a process for producing polycarbonates having heat and impact resistance.

It is yet another object of this invention to provide a process for producing polycarbonates with a well-focused molecular weight distribution.

It is still another object of this invention to provide an apparatus with a simple system to continuously produce polycarbonates having the above characteristics.

According to this invention, quality polycarbonates can be obtained by an improved process which is free from the various drawbacks of the prior art methods. The improvement of this invention exists in that chloroformate ester, prepared in advance by reacting alkaline and a solution of dioxy compound and phosgene, is reacted with alkaline solution of dioxy compound in a turbulent flow of the two solutions while cooling, and subsequently in a laminar flow after the viscosity thereof has become significant.

DETAILED DESCRIPTION OF THE PREFERRED EMBODIMENTS

Figure 1:
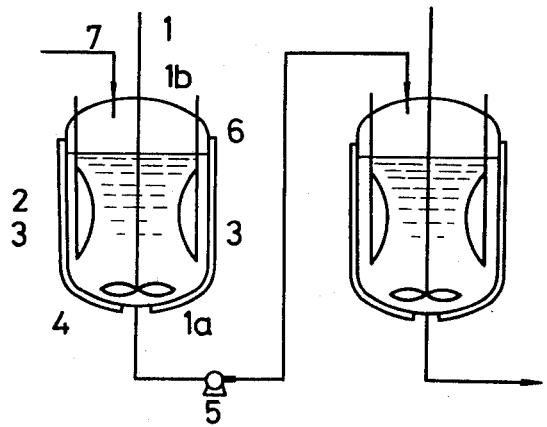
FIG. 1 illustrates a schematic sectional side view of a set of tanks connected in series, from a prior art apparatus.

The starting material of this invention, chloroformate ester, can be prepared by reacting an alkaline solution of dioxy compound with phosgene. The average molecular weight of chloroformate ester is preferably from 350 to 1200 and more preferably from 400 to 1000.

In the present invention, the dioxy compound includes 4,4'-dioxydiphenyl-alkaline such as 4,4'-dioxydiphenyl-2,2-propane (bisphenol A), 4,4'-dioxydiphenyl-1,1-butane and their halogenated derivatives, 4,4'-dioxydiphenyl alkyl acid, 4,4'-dioxydiphenyl sulfone and mixture thereof. Dioxy compound is preferably used at the concentration of from 20 to 200 grams per liter of alkaline solution, more preferably from 50 to 170 grams per liter. The preferred amount of dioxy compound is from 0.1 to 1.0 mol per mol of chloroformate group in chloroformate ester, more preferably from 0.2 to 0.5 mol.

Solvent available for reacting phosgene with an alkaline solution of dioxy compound includes chlorinated hydrocarbon such as methylene chloride, tetrachloroethane, 1,2-dichloroethylene, chloroform, trichloroethane, dichloroethane and chlorobenzene; dioxane; therahydrofuran; acetophenone and mixture thereof. These solvents have an ability to dissolve aforementioned polycarbonate oligomer and high molecular weight polycarbonate. Solvent is used in the amount to make the concentration of polymer in the solvent from 6 to 25 wt. %, more preferably from 10 to 20 wt. %

Caustic alkali of the present invention includes strong basic hydroxides such as sodium hydroxide and potassium hydroxide. Preferably, from 1 to 3 N of caustic alkali solution is used, and more preferably, those of from 1.2 to 2 N.

Chloroformate ester obtained by reacting alkaline solution of dioxy compound with phosgene in the presence of suitable solvent is oligomer having hydroxy (—OH) group and chloroformate (—OCOCl) group at termini of molecule and proportion of these groups can be set any values by fixing properly such conditions as means of introducing phosgene, concentrations of alkaline solution of dioxy compound and reaction temperature. Preferable proportion of hydroxy group and chloroformate group (i.e. —OH/—OCOCl) is 0/100 – 50/50.

Besides above mentioned chloroformate ester and alkaline solution of dioxy compound, catalyst, solvent, antioxidant and molecular weight modifier are introduced into the tube-type reaction vessel of the present invention. As catalyst, tertiary amines or halogen salt of quarternary ammonium can be used and aforementioned solvent can be used as solvent for the reaction. Sodium hydrosulfite can be used as antioxidant, and alcohols, phenols, and halogenated phenols can be employed as molecular weight modifier. In addition to above mentioned reaction materials in the present invention, conventional antioxidant, lubricant, fluidity improver, colorant and so on can also be used.

All the aforementioned reaction materials are introduced into the tube-type reaction vessel having a ratio of tube length to tube diameter larger than 8. The reason why the ratio of length to diameter is larger than 8 is to attain complete reaction of the initial product of polycarbonate (polycarbonate oligomer) during passing through the tube-type reaction vessel and to remove reaction heat of condensation efficiently by cooling water. The reaction materials introduced into the reaction vessel are in a turbulent flow and mixed to emulsify, and thus polycarbonate resin is obtained.

This polymerization reaction is preferably carried out at a temperature of from 20° to 50°C, more preferably from 25° to 40°C. Subsequently, the resultant reaction mixture containing polycarbonate flows through the tube-type reaction vessel to comlete the reaction.

Reaction flow is shifted from a turbulent flow to a laminar flow when the viscosity of the reaction mixture reached about 10 – 90 %, preferably 20 – 60 % of the viscosity of final product. Usually, the final product, polycarbonate, has a viscosity of from 300 to 4000 cp.

Although the reaction mixture has already become apparently viscous at the inlet of laminar zone, stirring heat as seen in the case of high speed agitation does not evolve.

Now, for a comparative study, a typical apparatus of the prior art is shown in FIG. 1, where tanks 4 with stirring device 1, cooling jacket 2 and baffle plate 3 are connected in a series through pump 5. After feeding a reaction mixture 6 consisting of polycarbonate oligomer, alkaline solution of dioxy compound, catalyst, molecular weight modifier and so on through the inlet 7, condensation reaction proceeds in each tank by mixing reaction mixture 6 with blades 1a of stirring device 1.

Figure 2:
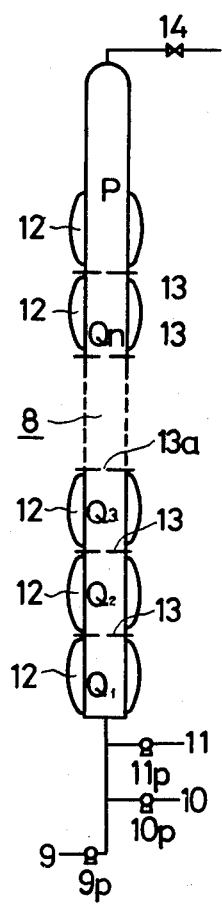
FIG. 2 illustrates a schematic sectional side view of an embodiment of the apparatus of this invention.

Embodiments of the apparatus of the present invention are shown in FIGS. 2 through 5. Referring to FIG. 2 which shows an embodiment of the apparatus: 8 indicates tube-type reaction vessel, 9, 10 and 11 indicate inlets for oligomer, alkaline solution of dioxy compound and catalyst (molecular weight modifier and other additives) respectively, 9p, 10p and 11p show feeding pumps, 12 shows a jacket of reaction vessel, 13 shows orifice plate set perpendicular in the longitudinal direction of reaction vessel 8, and 13a shows one or more holes on the plate. Several orifice plates are set at the zone near the inlet. Q1,Q2,Q3, . . . Qn indicate spacing between the above mentioned orifice plates and the reaction mixture becomes a turbulent flow when it passes through the orifices and thus is mixed in each small spacing, Q1,Q2,Q3, . . . Qn. P indicates a zone without orifice plate, located at the side of outlet of the tube-type reaction vessel 8. 14 shows control valve set at the outlet 15 of the reaction vessel 8 and this valve maintains the inside of reaction vessel 8 under pressure in order to avoid boiling of the reaction mixture at Q1,Q2,Q3, . . . Qn and P. The tube-type reaction vessel is glass-lined or made of stainless steel.

Figure 3:
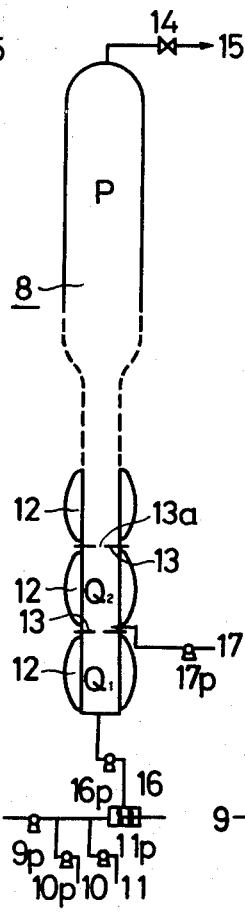
FIG. 3 illustrates a schematic sectional side view of another embodiment of the apparatus.

FIG. 3 illustrates another embodiment of the tube-type reaction vessel of the present invention having larger diameter at zone P and thus a holding time of the reaction mixture is increased. 16 Indicates a line blender-mixture in order to attain efficient mixing at the early stage of reaction, 16p shows an auxiliary pump, 17 is inlet for feeding various additives separately to the zone Q, and 17p indicates feeding pump. Although it is not shown in the drawing, partition plates can be set at zone P in parallel with longitudinal direction of the tube and centrifugal pump can replace line blender-mixer.

Figure 4:
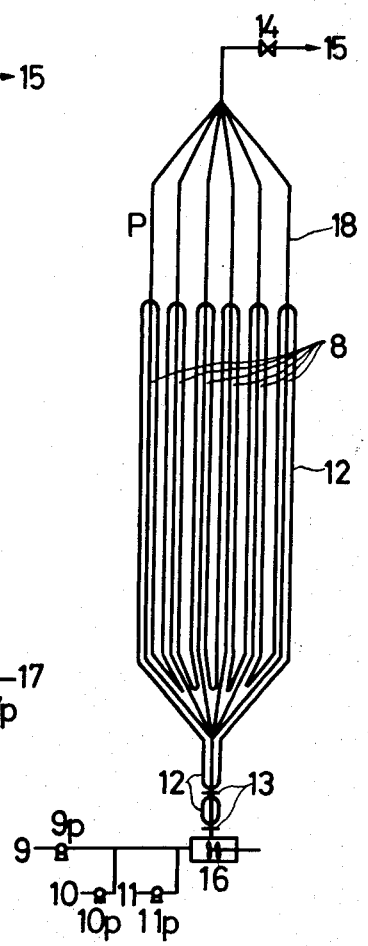
FIG. 4 illustrates a schematic sectional side view of the third embodiment of the apparatus.
Figure 5:
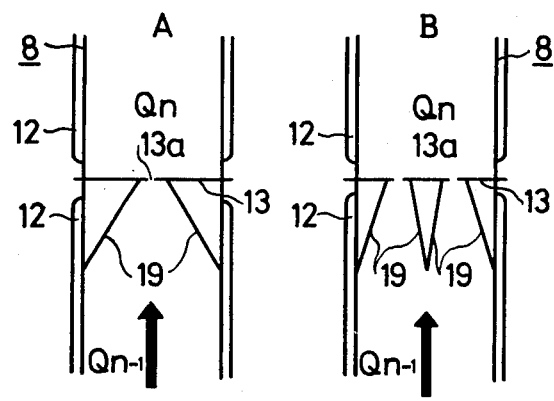
FIGS. 5A and 5B illustrate an enlarged schematic sectional side view of the reaction tube of the apparatus.

Zone P can be divided into small diameter pipes 18 which serve as an effective heat exchanger (FIG. 4).

FIGS. 5A and 5B show enlarged drawings of the part about orifice plate 13 of the above mentioned tube-type reaction vessel, indicating that one (FIG. 5A) and two (FIG. 5B) rectifying plates 19 are set respectively at the inflow side of orifices 13a. By these rectifying plates 19, stagnation of flow is avoided and thus smooth operation of the reaction tube can be provided.

Further to the tube-type reaction vessel of the present invention, baffle rods or fine rectifiers such as Static Mixer can be set at zone P, in order to increase agitation effect. Part of the reaction vessel can be designed as a parallel multitube-type reaction vessel and can be made horizontal or vertical. Catalyst and additives are introduced at any optional site of the vessel, if necessary.

In practicing the process of condensation using the tube-type reaction vessel of the present invention, the reaction materials containing polycarbonate oligomer are introduced through inlets 9, 10 and 11 while flowing cooling water through jacket 12, and these materials are mixed as emulsion by orifice plate 13 or line blender-mixer 16 and subsequently polymerization reaction proceeds at Q1,Q2,Q3, . . . Qn. Although the reaction mixture increases its viscosity due to progress of condensation, it flows into zone P to form a laminar flow. Since the reaction proceeds in a laminar flow, heat caused by stirring as observed in stirring tanks does not evolve. The resultant reaction mixture containing polycarbonate is taken out of outlet 15.

Since the tube-type reaction vessel of the present invention does not possess almost any driving parts, mechanical troubles will not occur at all. Furthermore, stirring of the reaction mixture is made only at the initial stage of the condensation and agitation is not applied to highly viscous reaction mixture and thus almost no agitating heat evolves. It has the further advantages of having a larger area for heat transfer because of its tube-type structure, and thus reaction-heat is easily eliminated by passing cooling water through a jacket without employing any special coolant. Therefore, apparatus for refrigeration used in the conventional process are unnecessary. Besides, the amount of phosgene required for the reaction is diminished and scale-up of the reaction apparatus to a larger scale, which was impossible with usual stirring tank systems, is possible, for it is easy to keep the mechanical strength of the tube-type reaction vessels. The liquid inside the reaction vessels of the present invention flows with piston flow and thus an exchange of the reaction mixture can be achieved in a short period of time, and the amounts of off-grade products are almost negligible in case of changing grades. Furthermore, polycarbonate resin obtained by the process of the present invention has a very narrow distribution of molecular weight and shows excellent physical properties such as heat resistance, impact resistance and so on.

The invention may be described in detail by means of the following examples, comparative examples and reference examples. Unless otherwise stated, percent in the examples indicates weight percentage.

REFERENCE EXAMPLE

Polycarbonate oligomer used in the following examples was prepared by the method as described below. Alkaline solution of bisphenol A was prepared by dissolving 60 kg of bisphenol A into 400 liters of 5% NaOH. This alkaline solution of bisphenol A and methylene chloride, each component being kept at room temperature, were introduced into a tube-type reaction vessel having the inside diameter of 10 mm and the length of 10m at the rate of 138 liters per hour and 69 liters per hour respectively through orifice plates and furthermore phosgene was introduced concurrently at the rate of 10.7 kg per hour to react continuously for 3 hours. The reaction vessel used above was a double tube-type structure and cooling water was passed through a jacket to keep the temperature of the reaction solution at 25° C at outlet of the vessel. The pH of the reaction mixture was kept at 10 to 11. The reaction mixture thus obtained was separated by standing to an aqueous layer and a methylene chloride layer in order to remove the aqueous layer. The methylene chloride layer (220 liters) was thus obtained and then 342 liters of methylene chloride were added to it and agitated thoroughly to prepare oligomeric polycarbonate (concentration of 220 g per litter). The resultant oligomer had the average molecular weight of 430.

EXAMPLE 1

Figure 6:
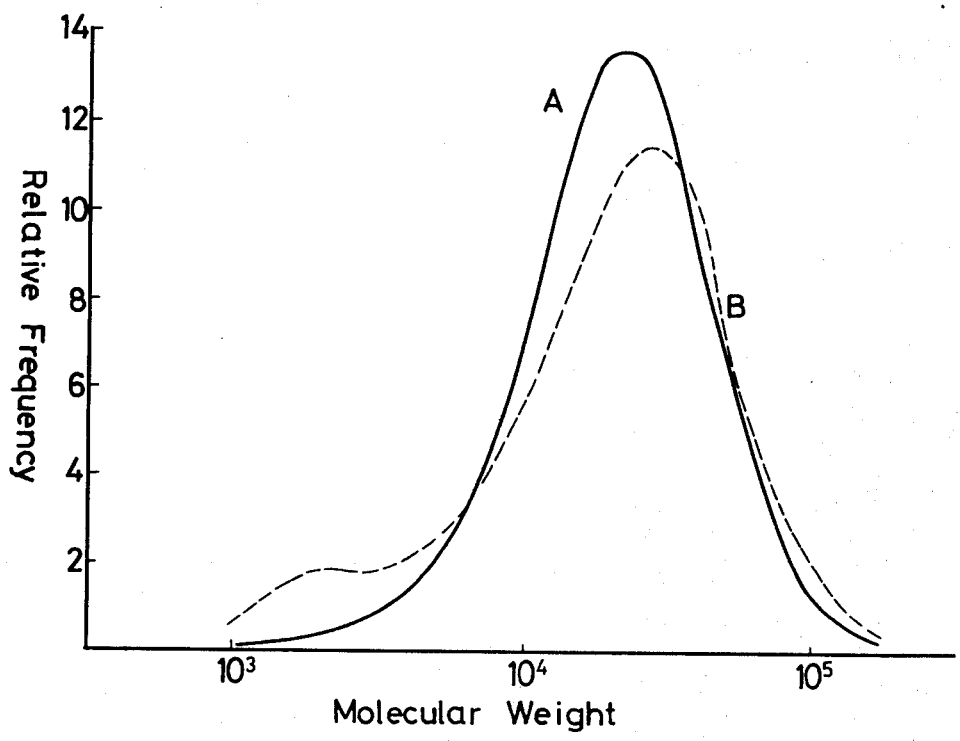
FIG. 6 shows a graph of the relationship between molecular weight and relative frequency.

The tube-type reaction vessel was operated for five hours with forced introduction of oligomer (7.5 liters per hour), bisphenol A NaOH solution (2.5 liters per hour) containing 1.6 N NaOH solution, 117 g of bisphenol A per liter and 0.1 wt. % of sodium hydrosulfite, 48 wt. % of NaOH solution (128 ml per hour) and triethylamine solution containing 33.1 g per liter of water (70 ml per hour) with the aid of feeding pumps for each component. Molecular weight modifier (p-tertiary butyl phenol) was added by dissolving it in the above oligomer solution at the concentration of 3.2 g per liter. The tube-type reaction vessel possessed the inside diameter of 42.6 mm, the length of 5 m, and 15 orifice plates having one hole of 1 mm diameter per plate which were set every 250 mm perpendicular to longitudinal direction, and a cooling jacket where cooling water was passed through in order to remove reaction heat and to keep the temperature of the outlet of the reaction vessel at 30° C. Clean polycarbonate methylene chloride solution was obtained by washing the reaction mixture with acid and succeeding sufficient water-washing. Upon the completion of the reaction, concentration of $Na_2CO_3$ in aqueous phase was 0.11 mol per liter. Average molecular weight of the polymer was 28,400 and the ratio of weight-average molecular weight (Mw) to number-average molecular weight (Mn), Mw/Mn, which is the index of distribution of the molecular weight in polymer, was found to be 1.91. Molecular weight distribution of the polymer was measured by gel permeation chromatography using an apparatus of Waters Associates at 130° C with o-dichlorobenzene as a solvent. The results of this process are shown in FIG. 6 as Curve A together with the results of Comparative Example 1 described in the later section.

EXAMPLE 2

The oligomer and feeding rates of various ingredients were the same as described in Example 1. The tube-type reaction vessel in this example possessed a line blender-mixer (800 rpm) with content of 1.5 liters just behind the inlet of materials and other additives and, behind the line blender-mixer, a jacketed tube having the inside diameter of 42.6 mm and the length of 5 m. The operating procedure was the same as shown in Example 1. The reaction mixture obtained from the outlet of the reaction vessel was subjected to washing and analysis, and then polymer was recovered from it. The results of the experiment are shown in Table 1.

EXAMPLE 3

After 5 hours of proceeding of the reaction under steady operating conditions using the same tube-type reaction vessel as shown in Example 2, the polymerization reaction was continued under the same condition as described in Example 2, except that the amount of p-tertiary butyl phenol was set at the concentration of 5.0 g per liter of oligomer solution. Molecular weight of polymer in samples taken out of the outlet of the reaction vessel every 5 minutes showed intermediatory values for about 35 minutes after a change in the composition. The results obtained under steady conditions are shown in Table 1.

EXAMPLE 4

The oligomer and feeding rates of various ingredients were the same as described in Example 1. The tube-type reaction vessel in this example possessed a line blender-mixer (1200 rpm) with a content of 0.5 liters just behind the inlets of oligomer containing 5.0 g of p-tertiary butyl phenol per liter, bisphenol A in NaOH solution and triethylamine solution and, behind the mixer, a coiled tube having the inside diameter of 16 mm and the length of 12 m. Furthermore, five orifice plates each having a single hole of 1 mm in diameter were set with an interval of every 100 mm from the outlet of the line blender-mixer perpendicular to longitudinal direction. The solution of NaOH was introduced between the first and second orifice plate. A regulatory valve was set at the terminal of the tube in order to control pressure in the reaction vessel. The tube (6 m from the outlet of the line blender-mixer) was immersed in a water bath in order to cool and was operated for 5 hours keeping the temperature of the reaction mixture at the outlet at 30° C. The resultant reaction mixture was washed and analyzed and then polymer was recovered from it. The results are shown in Table 1.

COMPARATIVE EXAMPLE 1

Two 30 liter tanks with a jacket and agitator were connected in a series to form a set of mixing tank system and to the first tank the same materials and additives as described in Example 1 were introduced at the following rates. Namely, oligomer containing 3.2 g of p-tertiary butyl phenol per liter, bisphenol A in NaOH, aqueous solution of NaOH, and solution of triethylamine were fed at the rates of 5 liters per hour, 1.6 liters per hour, 86 ml per hour, and 46.5 ml per hour respectively. Both the first and second tanks were kept at 30° C agitating at 250 rpm, and operated for 30 hours. The total heat evolved in both tanks by agitation was about 90 kcal per hour. In this example, a considerably large amount of heat must be removed as compared with the cases described in Examples 1 through 4. The results of analysis of the reaction mixture and molecular weight of polymer produced are shown in Table 1. In addition, the molecular weight distribution of the polymer is shown in FIG. 6 as Curve B.

COMPARATIVE EXAMPLE 2

After 5 hours of proceeding with the reaction under steady operating conditions using the same process as shown in Comparative Example 1, the operation was continued under the same condition as described in Comparative Example 1 except that the amount of p-tertiary butyl phenol was set at 5.0 g per liter of the oligomer solution. The molecular weight of polymer changed very gradually and reached a constant value after 28 hours as shown in Table 1.

From the aforementioned results, it is obvious that the tube-type reaction vessels of the present invention provide polymer of very narrow distribution in molecular weight and the formation of about one-half the amount of Na2CO3, as compared with conventional stirring tank systems. The formation of a lesser amount of Na2CO3 indicates a decrease in the consumption of phosgene. In addition to the above advantages, according to the process described in the present invention, the amount of heat to be removed from the system and the amount of off-grade products are extremely small.

TABLE 1

| Example | Type of Reaction Vessel | Molecular Weight Modifier (g per liter of oligomer) | Molecular[1] Weight of Product Mv | $Na_2CO_3$ in Aqueous Layer (mol/l) | Mw/Mn[2] |
|---|---|---|---|---|---|
| Example 1 | This invention | 3.2 | 28,400 | 0.11 | 1.91 |
| Example 2 | " | 3.2 | 28,600 | 0.09 | 2.02 |
| Example 3 | " | 5.0 | 22,500 | 0.11 | 1.82 |
| Example 4 | " | 5.0 | 22,600 | 0.10 | 1.79 |
| Comparative Example 1 | Usual stirring tank | 3.2 | 26,200 | 0.21 | 3.03 |
| Comparative Example 2 | " | 5.0 | 21,300 | 0.22 | 2.95 |

[1])Mv was measured at 20°C using methylene chloride as a solvent and was calculated by the following equation:
$$[\eta] = 1.23 \times 10^{-5} Mv^{0.83}$$
[2])Mw/Mn was measured by gel permeation chromatography (GPC Method).

We claim:
1. A process for the continuous preparation of polycarbonate resins having an improved molecular weight distribution comprising the steps of:
   a. reacting a mixture of a chloroformate ester oligomer and a dioxy compound under turbulent flow conditions to form a polycarbonate resin having a viscosity of 10–90% of the final viscosity of said polycarbonate resin; and
   b. continuing the reaction under laminar flow conditions until said polycarbonate resin has a final viscosity of from 300 to 4,000 cps.

2. The process of claim 1 wherein said mixture of oligomer and dioxy compound react under said turbulent flow conditions to form a polycarbonate resin having a viscosity 20–60% of the final viscosity of said polycarbonate resin.

3. The process of claim 1 wherein said dioxy compound is an aromatic dioxy compound.

4. The process of claim 1 wherein said oligomer has a molecular weight in the range of 350–1200.

5. The process of claim 3 wherein said dioxy compound is present in an amount of 0.1–1.0 mole per mole of chloroformate group in said chloroformate ester oligomer.

6. The process of claim 1 wherein said dioxy compound is selected from the group consisting of 4,4'-dioxydiphenyl alkane, halogenated derivatives thereof, 4,4'-dioxydiphenyl alkyl acid, and 4,4'—dioxydiphenyl sulfone and mixtures thereof.

7. The process of claim 1 wherein a molecular weight modifier is introduced into said mixture.

8. The process of claim 1 wherein said mixture is reacted at a temperature range of from about 20°–50°C.

9. The process of claim 1 wherein the heat of the reaction is removed by cooling so as to maintain said reaction at about 20°–50°C.

10. The process of claim 1 wherein said chloroformate ester oligomer is formed by reacting said dioxy compound with phosgene.

11. The process of claim 10 wherein said dioxy compound is selected from the group consisting of 4,4'-dioxydiphenyl alkane, halogenated derivates thereof, 4,4'-dioxydiphenyl alkyl acid, and 4,4'-dioxydiphenyl sulfone, and mixtures thereof.

12. The process of claim 10 wherein said dioxy compound is in an alkaline solution.

13. The process of claim 10 wherein sufficient solvent is added such that the concentration of the final polycarbonate resin is 6–25 weight percent.

* * * * *